United States Patent [19]
Phillips

[11] Patent Number: 6,073,318
[45] Date of Patent: Jun. 13, 2000

[54] RETAINING CLIP ASSEMBLY

[75] Inventor: Robert W. Phillips, Waterloo, Canada

[73] Assignee: Research in Motion Limited, Waterloo, Canada

[21] Appl. No.: 09/305,174

[22] Filed: May 4, 1999

[51] Int. Cl.[7] .............................. A44B 21/00; A45F 5/00
[52] U.S. Cl. ........................... 24/499; 24/3.9; 24/3.11; 24/3.12
[58] Field of Search .................... 24/499, 3.9, 3.11, 24/3.12, 705

[56] References Cited

U.S. PATENT DOCUMENTS

| | | | |
|---|---|---|---|
| 845,743 | 3/1907 | Bindner | 24/3.12 |
| 3,597,813 | 8/1971 | Takahashi | 24/499 |
| 4,881,150 | 11/1989 | Oyamada | 24/3.11 |
| 4,959,882 | 10/1990 | Wang | 24/499 |
| 5,016,326 | 5/1991 | Goldenberg | 24/3.11 |
| 5,261,583 | 11/1993 | Long et al. | 24/3.9 |
| 5,301,393 | 4/1994 | Brown | 24/499 |
| 5,385,282 | 1/1995 | Chen | 24/3.11 |
| 5,678,281 | 10/1997 | Kamp et al. | 24/3.11 |
| 5,709,012 | 1/1998 | Ebashi | 24/3.12 |
| 5,829,102 | 11/1998 | Conti | 24/3.12 |

FOREIGN PATENT DOCUMENTS

| | | | |
|---|---|---|---|
| 1570080 | 6/1969 | France | 24/499 |

*Primary Examiner*—Victor N. Sakran
*Attorney, Agent, or Firm*—Jones, Day, Reavis & Pogue; Charles B. Meyer, Esq.

[57] ABSTRACT

A clip is disclosed for securing a device to a support structure. The clip assembly includes a clip for pivoting about a pivoting axis, wherein the clip includes a securing end for engaging the support structure. A base is attached to the device, for receiving the clip. A biasing member is received between the base and the clip, for biasing the securing end of the clip toward the base, to secure the support structure therebetween. The clip assembly includes a first mating structure, formed on the clip, for attaching to a second mating structure formed on the base. The first and second mating structures are attached by sliding into engagement along the direction of the pivoting axis.

7 Claims, 4 Drawing Sheets

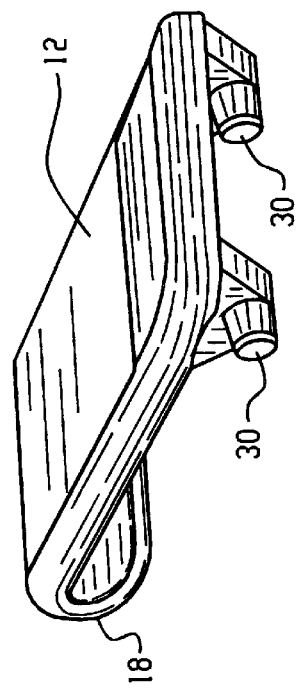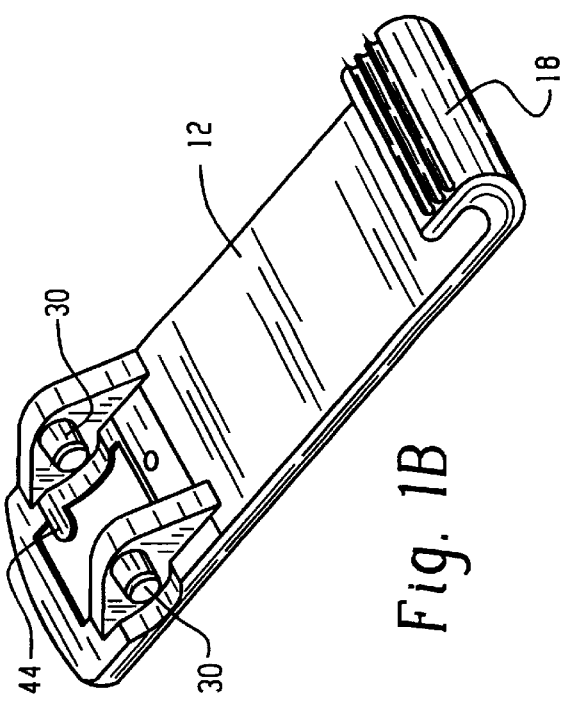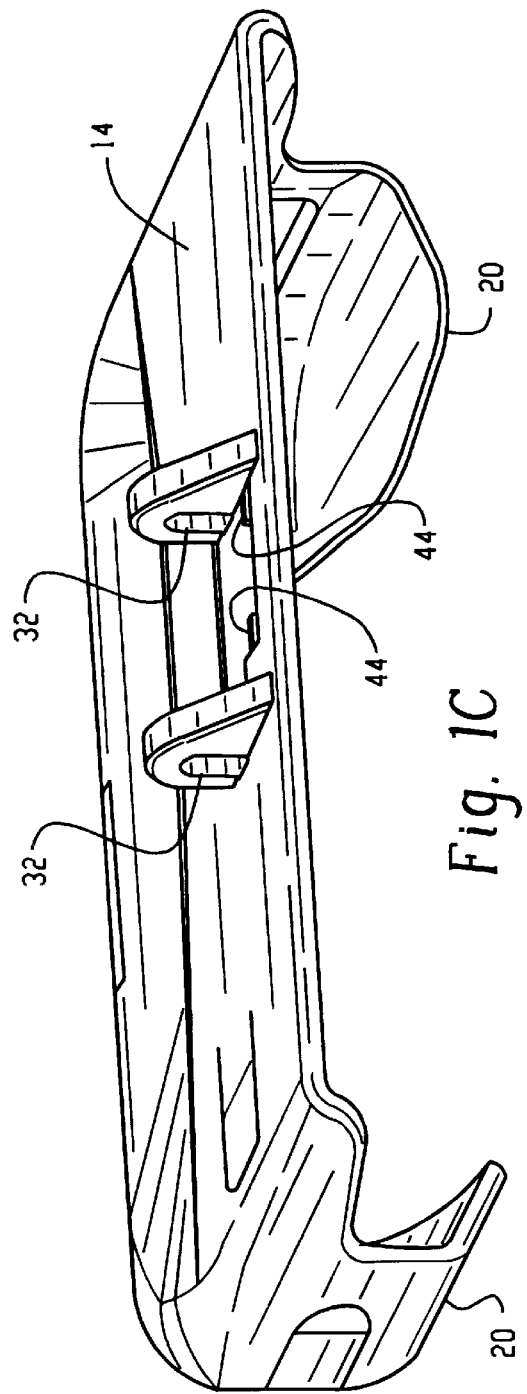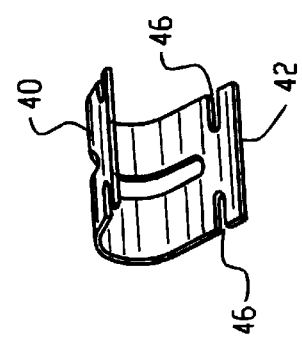

RETAINING CLIP ASSEMBLY

BACKGROUND OF THE INVENTION

The present invention is directed to the field of retaining clips, particularly those of the type used to removably secure a device to a support structure. The invention has particular applicability to the field of portable personal pagers, which are removably secured to a belt or other article of clothing worn by a user. The invention can also be used in pager applications and others in which a retaining clip is affixed to a holster, which retains the pager or other device.

A typical previous retaining clip assembly includes a clip which is pivotally attached to a base, i.e. a device body or a holster. The clip and base are typically attached with a separate pivot pin which extends through mounting structures on the clip and base to secure the components and define a pivoting axis. A spring is typically inserted in an area between the clip and base to provide a biasing force that urges the clip into a "closed" position with the base. The clip assembly is mounted to a belt or other support structure to secure the support structure between the clip and base.

The pivot pin and spring have been observed to cause certain problems in the manufacture of previous retaining clip assemblies. A pivot pin is typically inserted in a riveting operation. Proper pin insertion requires that the clip and base be properly aligned. However, due to space constraints, the spring must be in place before pin insertion. Thus, the clip, base and spring must all be positioned simultaneously with the spring compressed. A holding force must be used to stabilize the assembly during assembly. However, it is difficult to work with a "live" spring while holding three components and inserting a pin. This can result in misalignment or loss of the spring, creating an awkward assembly process. This results in increased manufacturing time, thereby reducing efficiency and adding to the cost of manufacture.

BRIEF DESCRIPTION OF THE INVENTION

In view of the difficulties and drawbacks associated with previous clip assemblies, there is therefore a need for a clip assembly that provides greater ease of assembly.

There is also a need for a clip assembly that eliminates the need for a discrete pivot pin.

There is also a need for a clip assembly with increased manufacturing efficiency and reduced costs of manufacture.

These needs and others are satisfied by the method and apparatus of the present invention in which a clip assembly is provided for securing a device to a support structure. The clip assembly includes a clip for pivoting about a pivoting axis, wherein the clip includes a securing end for engaging the support structure and a base for receiving the device and the clip. A biasing member is received between the base and the clip, for biasing the securing end of the clip toward the base, to secure the support structure therebetween. The clip assembly includes a first mating structure, formed on the clip, for attaching to a second mating structure formed on the base. The first and second mating structures are attached by sliding into engagement along the direction of the pivoting axis.

As will be appreciated, the invention is capable of other and different embodiments, and its several details are capable of modifications in various respects, all without departing from the invention. Accordingly, the drawings and description are to be regarded as illustrative in nature and not restrictive.

BRIEF DESCRIPTION OF THE DRAWINGS

FIGS. 1A, 1B, 1C and 1D illustrate the various components of the present clip assembly.

DETAILED DESCRIPTION OF THE INVENTION

Figure 2A:
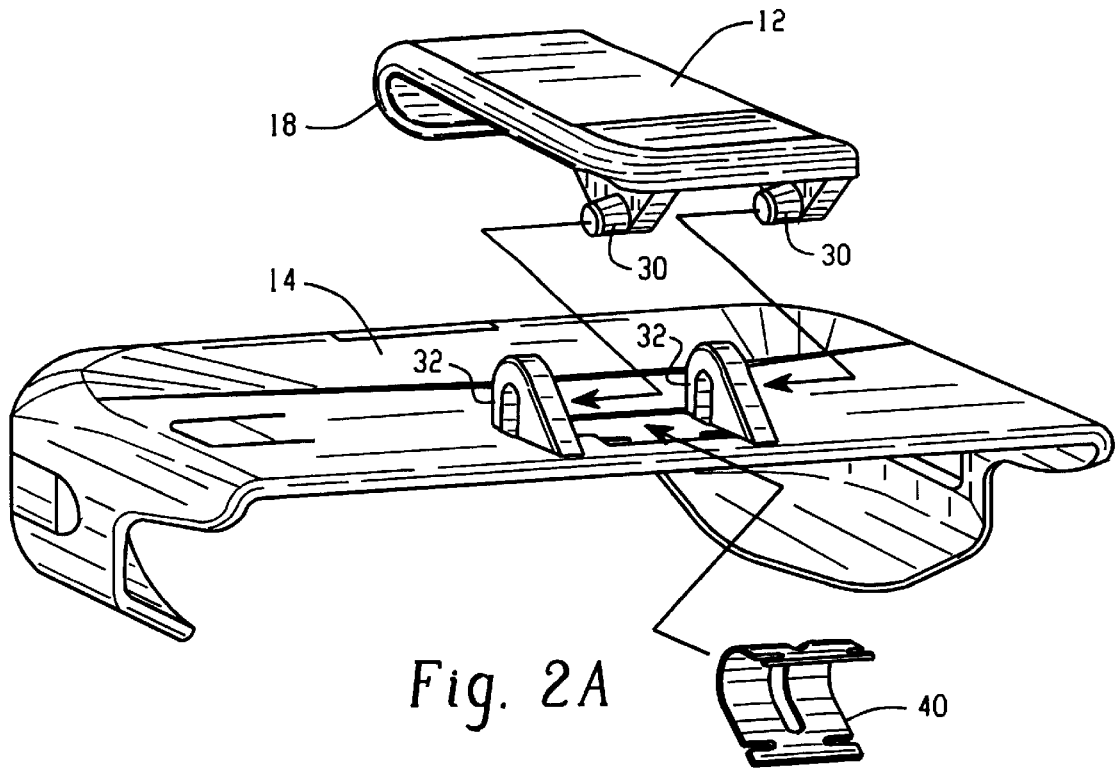
FIGS. 2A and 2B respectively show the assembly steps and the assembled product of the resent clip assembly.

The invention will now be described in reference to the figures, where like reference numerals refer to like elements. The clip assembly 10 of the present invention is formed by a pair of cooperating members, preferably a clip 12, received by a base 14, for pivoting about a pivoting axis 16. The clip 12 includes a securing end 18 for engaging a support structure. In the preferred embodiment, the present clip assembly 10 is used to secure a device (e.g. a mobile telecommunications device such as a pager) to a belt or other user-worn garment, or other suitable support structure. The base 12 is preferably a holster for removably receiving and holding the pager. As illustrated, the holster is generally open, and includes curved side portions 20 and a bottom 22, formed to conform to the shape of the pager.

Figure 2B:
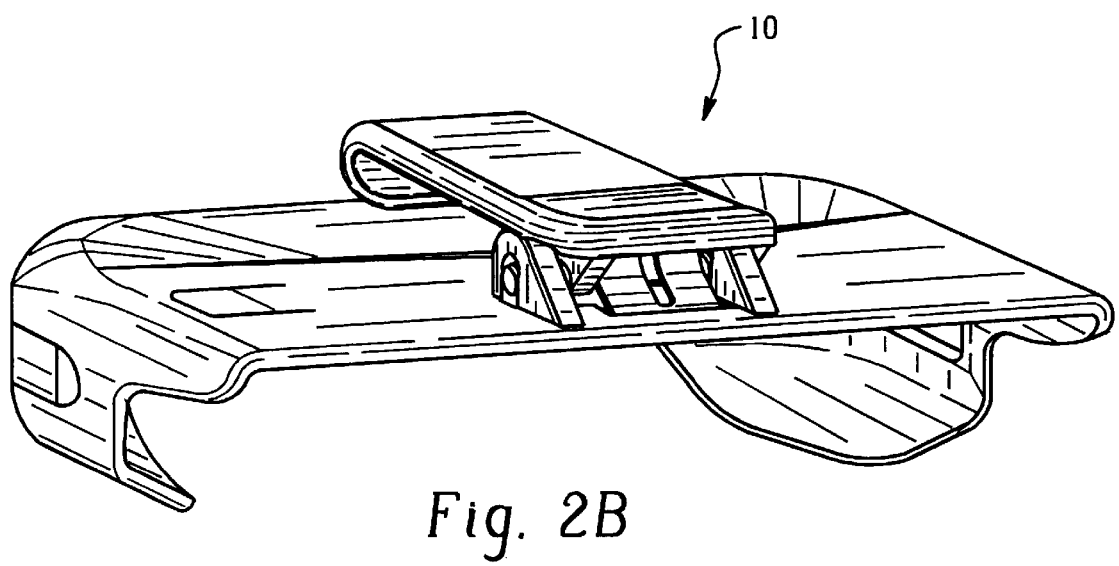
Figure 3A:
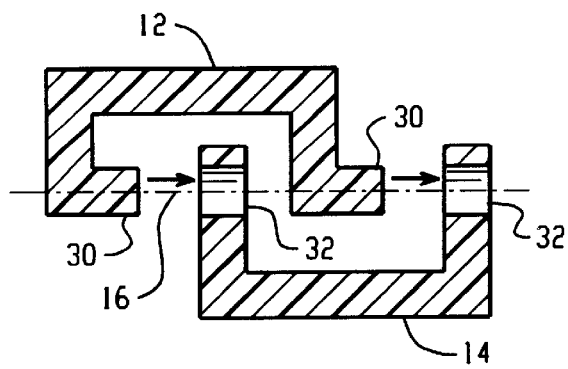
FIGS. 3A and 3B respectively show alternate embodiments of the pivoting mating structures of the present clip assembly.
Figure 3B:
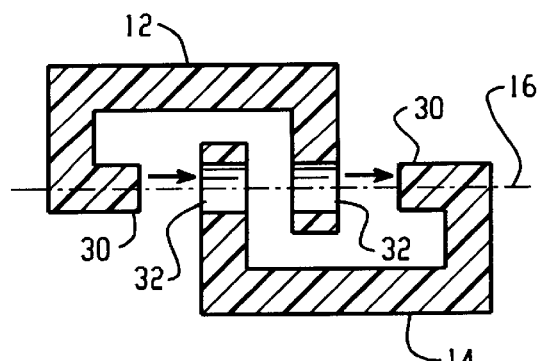
Figure 4A:
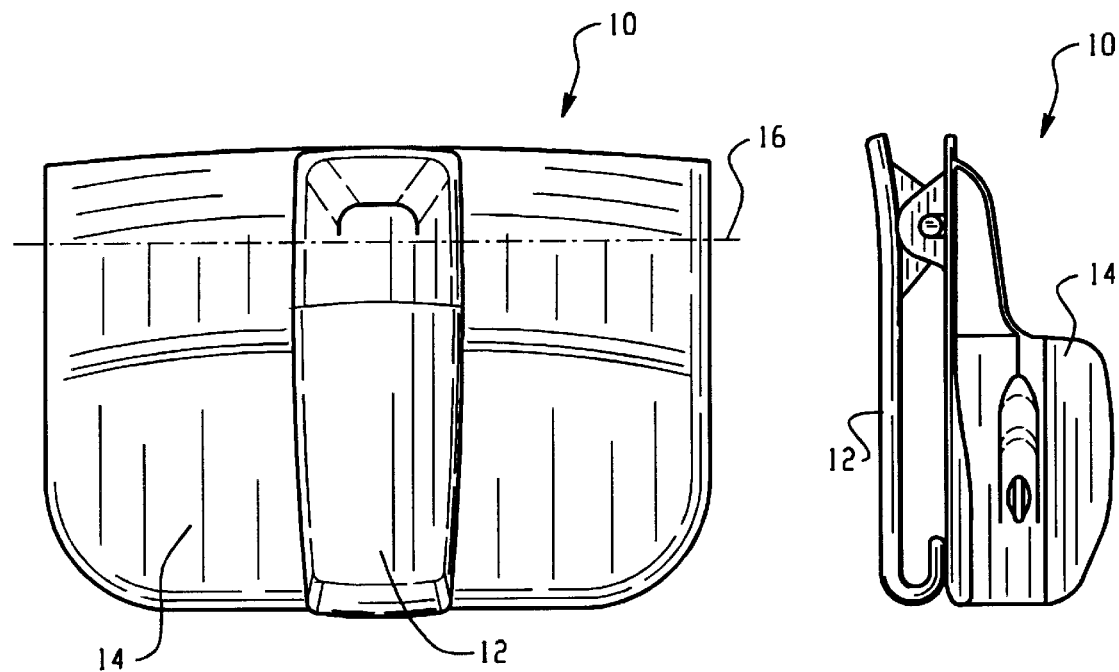
FIGS. 4A, 4B, 4C, 4D, 4E and 4F respectively depict frontal, side, side sectional, side sectional detail, top sectional and top sectional detail views of the present clip assembly.
Figure 4B:
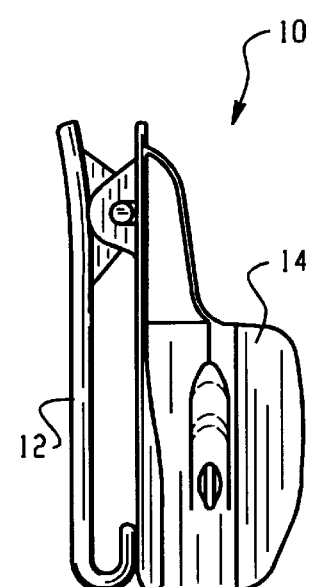
Figure 4C:
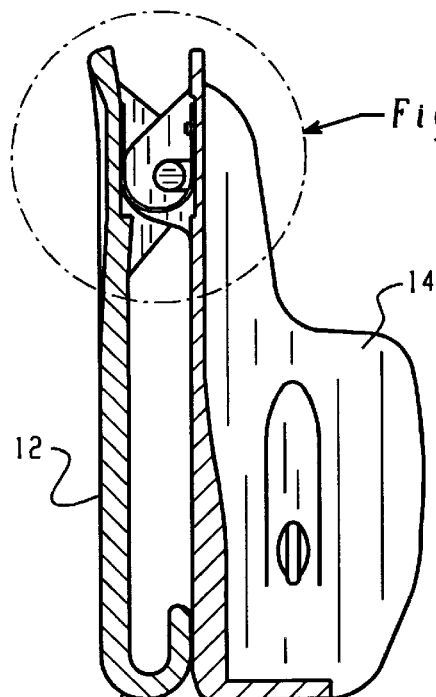
Figure 4D:
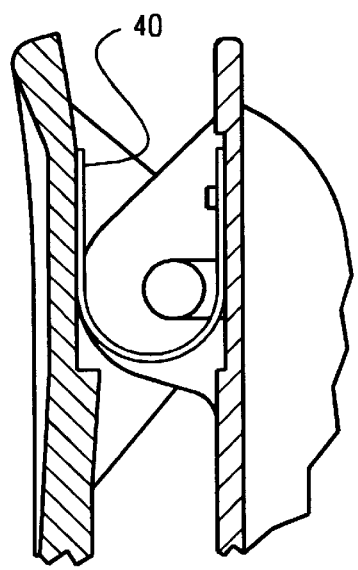
Figure 4E:
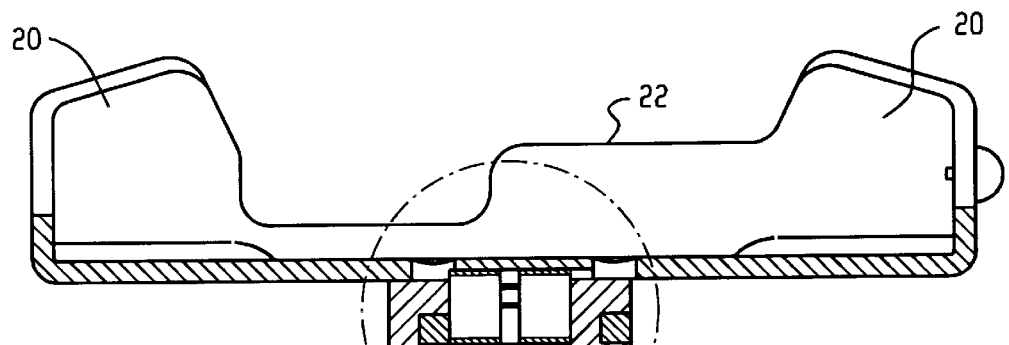
Figure 4F:
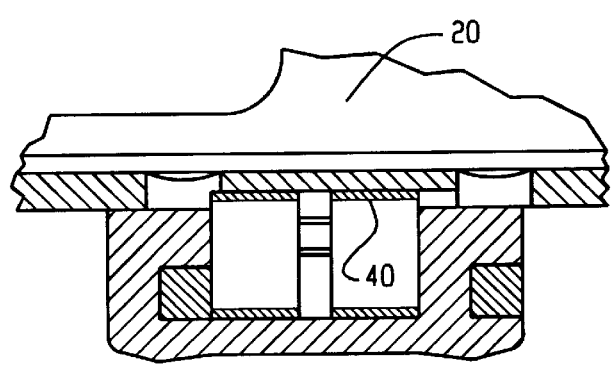

The assembly of the present clip assembly is shown in FIGS. 2A and 2B. The clip 12 and the base 14 include mating structures that permit rotational movement so as to define the pivoting axis 16. In the illustrated embodiment, a pair of axially-extending pivoting pins 30 are formed on the clip 12 at a position opposite the securing end 18. The pins 30 are received within a respective pair of apertures 32, formed on the base 14. The clip 12 and the base 14 are joined by axially sliding the pins 30 into the apertures 32 so that the clip 12 and the base 14 are in axially pivoting engagement about the pins 30. This configuration is also illustrated in FIG. 3A. However, FIG. 3B shows a configuration where a pin 30 and aperture 32 are formed on the clip 12, and a respective mating aperture 32 and pin 30 are formed on the base 14, for receiving the respective clip pin and aperture. It should be understood that any combination and number of pins and apertures can be formed on either the clip 12 or the base 14, all without departing from the invention.

After the clip 12 and the base 14 are axially slid into place, a biasing member, preferably a leaf spring 40, is inserted between the base 14 and the clip 12 at a position near the pivoting axis 16. The leaf spring 40 is preferably "C-shaped" so as to urge the securing end of the clip 12 toward engagement with the base 14, to secure an object, i.e. the support structure, therebetween. In this way, the clip 12 and the base 14 are mated without applying a holding force during assembly. Assembly is accomplished without requiring an assembler to do more than two things at once, and without applying a holding force.

The clip 12 and base 14 are formed to include a number of retaining tabs 44, which are received in a respective number of interlocking recesses 46 formed on the spring 40. The leaf spring 40 is of such a width 42 that once installed, clip 12 cannot become decoupled from base 14. The spring serves as both the biasing member and the assembly securing feature. The tabs and recesses 44, 46 cooperate to retain the spring between the clip 12 and the base 14, and prevent them from coming uncoupled. Of course, it should be understood that the tabs 44 and recesses 46 can be formed on the respective other components, and any combination thereof can be formed on either component, all without departing from the invention.

The present invention provides a clip assembly that is easy to assemble, since alignment is facilitated, and assembly errors are reduced. Also, no holding force is required for assembly. The invention is less expensive than previous devices since the metal pivot pin and the attendant riveting operation is eliminated, reducing the number of parts and assembly steps. The molded pin and aperture features do not add to the cost since they are included in the plastic molding.

As described hereinabove, the present invention solves many problems associated with previous devices, and presents an improvement in efficiency and economy. However, it will be appreciated that various changes in the details, materials and arrangements of parts which have been herein described and illustrated in order to explain the nature of the invention may be made by those skilled in the art within the principle and scope of the invention as expressed by the appended claims.

What is claimed is:

1. A clip assembly for mounting a device to a support structure, said clip assembly comprising:

a base configured to receive the device;

a biasing member; and a clip configured to secure said base on the support structure with a retaining force applied by said biasing member, said clip having an installed position on said base in which said clip and said base are pivotal relative to each other about an axis;

said clip being configured to be moved toward and into said installed position in first and second successive steps, said first step comprising movement of said clip radially toward said base into a partially installed position spaced along said axis from said installed position, said second step comprising movement of said clip along said axis from said partially installed position fully to said installed position.

2. A clip assembly as defined in claim 1 wherein said biasing member has an installed position interposed between said clip and said base, said clip and said base being configured to provide clearance for said biasing member to be moved fully into said installed position of said biasing member while said clip is in said installed position on said base.

3. A clip assembly as defined in claim 1 wherein said biasing member has an installed position interposed between said clip and said base and, when installed, blocks return movement of said clip relative to said base along said axis from said installed position of said clip to said partially installed position of said clip.

4. A clip assembly as defined in claim 1 wherein said clip and said base each have a pair of support structures, said support structures together defining a pair of pins and a pair of apertures, said pins projecting in a common direction such that when said clip is moved radially toward and into said partially installed position said pins become aligned along said axis, and subsequently when said clip is moved along said axis from said partially installed position fully to said installed position said pins are moved into said apertures in said common direction.

5. A clip assembly as defined in claim 1 wherein said base is a holster configured to contain the device.

6. A clip assembly as defined in claim 1 wherein said biasing member is a leaf spring.

7. A clip assembly as defined in claim 6 wherein said leaf spring, said base and said clip together define retaining tabs and interlocking recesses which retain said spring in said installed position by an interference fit.

\* \* \* \* \*